Figure 4:
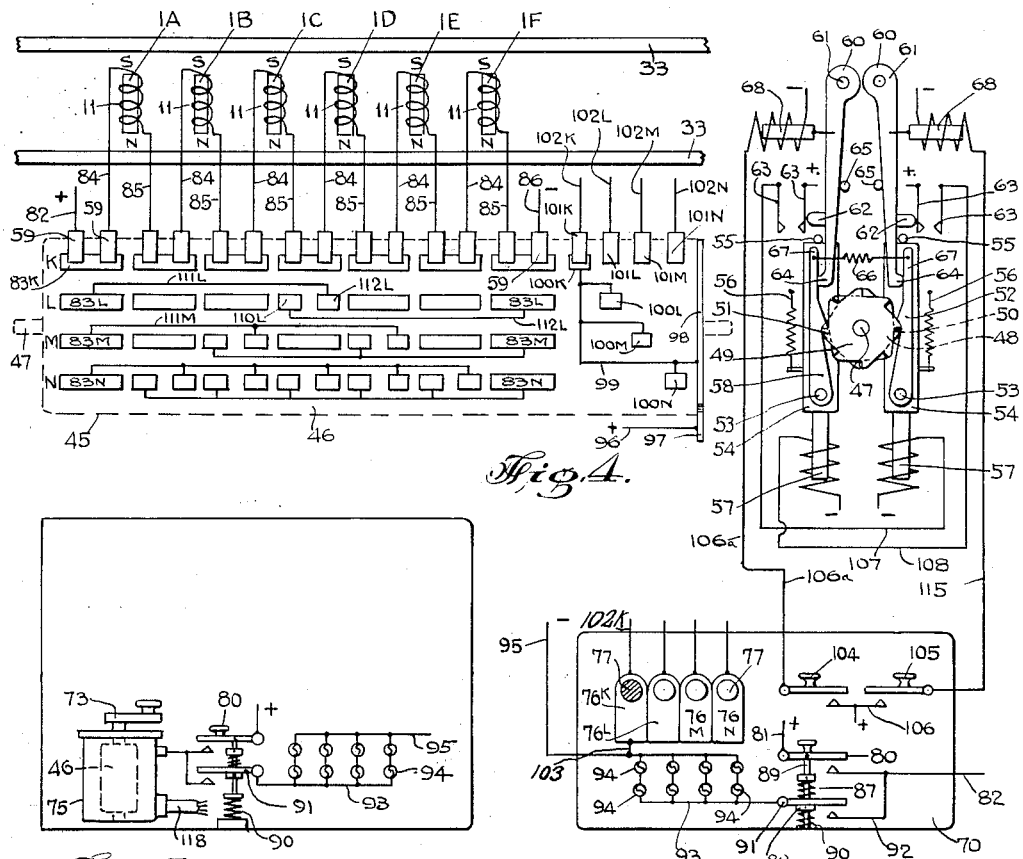

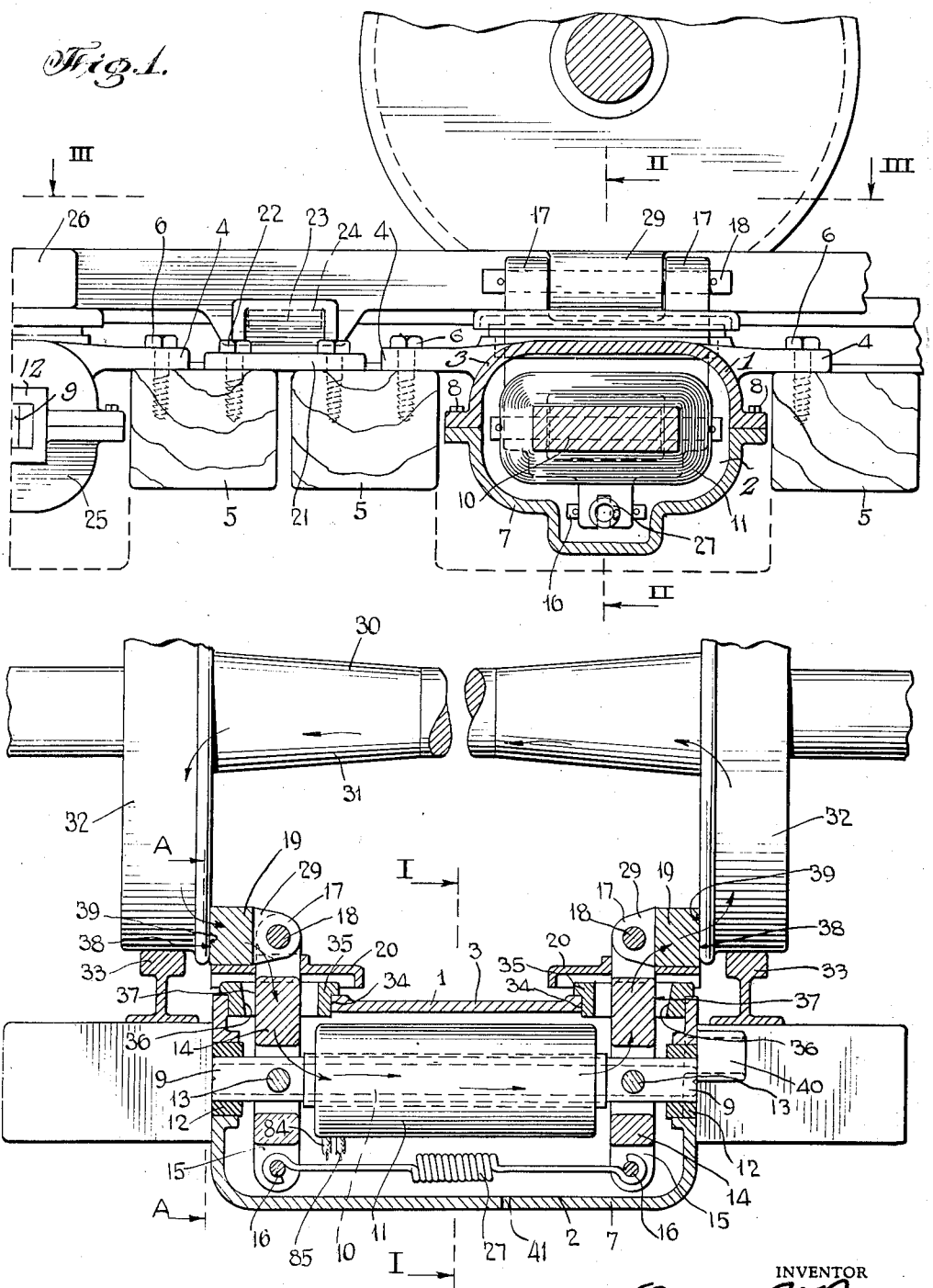

Dec. 11, 1934.   O. A. ROSS   1,984,320
MAGNETIC CAR RETARDER AND SYSTEM OF CONTROL THEREFOR
Filed Jan. 7, 1928   3 Sheets-Sheet 2
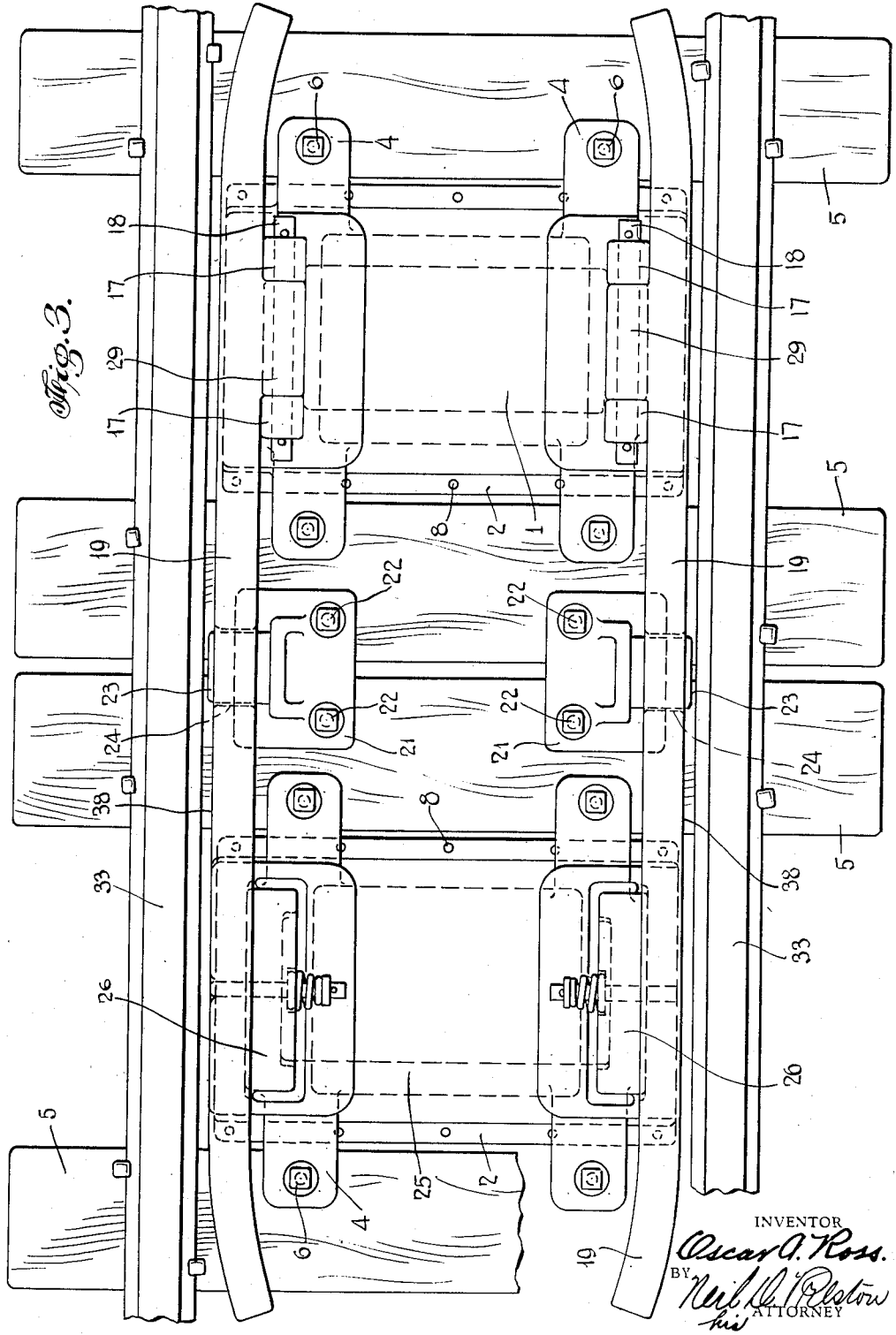

Dec. 11, 1934.    O. A. ROSS    1,984,320
MAGNETIC CAR RETARDER AND SYSTEM OF CONTROL THEREFOR
Filed Jan. 7, 1928    3 Sheets-Sheet 3

INVENTOR
Oscar A. Ross.
BY Neil D. Preston
ATTORNEY

Patented Dec. 11, 1934

1,984,320

UNITED STATES PATENT OFFICE 1,984,320

MAGNETIC CAR RETARDER AND SYSTEM OF CONTROL THEREFOR

Oscar A. Ross, New York, N. Y., assignor to General Railway Signal Company, Rochester, N. Y.

Application January 7, 1928, Serial No. 245,141

9 Claims. (Cl. 188—62)

This invention relates to car retarders and more particularly to a class which it is chosen to term "magnetic car retarders".

In the making up freight trains in freight yards of large railway systems, it is customary to employ what is known as a "hump" over which the cars are switched; said hump producing the required acceleration for moving said cars to the particular train of cars to which they are to be coupled. It has also been the custom to have an attendant, or "brakeman" ride said cars for the purpose of applying brakes thereon and reducing their speed to prevent possible "smashing" as said cars are coupled to said trains.

The prime object of this invention is to provide braking means for said cars whereby said "riding" of said cars by said brakemen will be eliminated and whereby the braking of said cars may be remotely controlled from a tower, or "hump house", said braking means comprising track instrumentalities on the trackway co-acting with the wheels of said cars.

Another object is to furnish a novel system of control for the aforesaid track instrumentalities whereby the degree of braking may be varied independently of the application thereof to said cars.

Another object is to furnish a novel form of apparatus for producing the aforesaid variable degree braking whereby said apparatus may be remotely controlled from the tower, or hump house.

Another object is to retard the movement of freight cars or similar vehicles, by magnetically causing frictional engagement of the aforesaid track instrumentalities with the wheels of said cars, the magnetic circuit for causing said frictional engagement including said track instrumentalities and the wheels and axles of said cars.

Another object is to furnish a car retarding system wherein the braking or retarding effect may be instantaneously applied or released whereby a sensitive control of the speed of said cars to be retarded may be obtained.

Another object is to furnish a car retarding apparatus comprising a minimum of exposed operating parts whereby possible failure of operation due to presence of ice, snow and sleet will be negligible. Also requiring a minimum removal of said ice, snow and/or sleet to maintain successful operation of said apparatus.

Another object is to furnish a mechanism of the kind heretofore described wherein the housing for said mechanism may be made of ferric material, however by novel arrangement of the structure preventing substantial magnetic flux leakage when and as said flux is rendered effective to cause magnetic making.

Other objects and advantages will appear as the description of the invention progresses, and the novel features of the invention will be pointed out in the appended claims.

This invention consists in the novel construction and arrangement of parts hereinafter described, delineated in the accompanying drawings, and particularly pointed out in that portion of the instrument wherein patentable novelty is claimed for certain and peculiar features of the invention, it being understood that, within the scope of what hereinafter thus is claimed, divers changes in the form, proportions, size and minor details of the device and system of control therefore may be made without departing from the spirit of, or sacrificing any of the details of the invention.

In describing the invention in detail, reference is had to the accompanying drawings wherein I have illustrated embodiments of my invention, and wherein like characters of reference designate corresponding parts throughout the several views, and in which:—

Figures 5, 6:
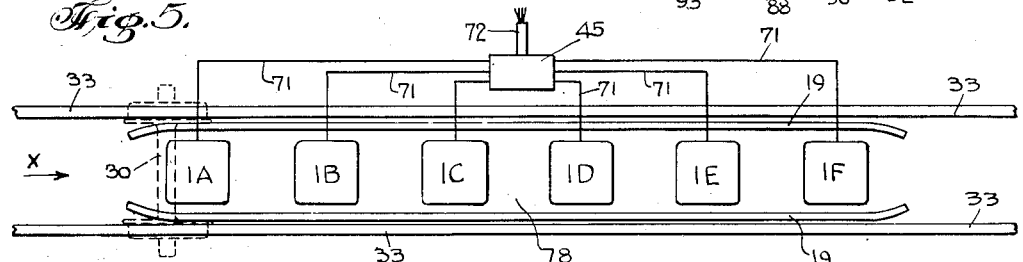
Figure 7:
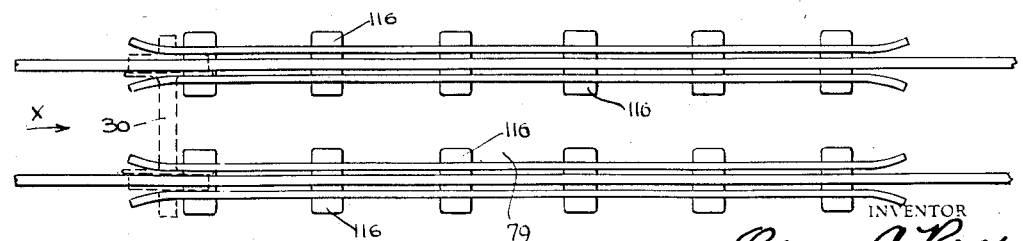

Figure 1 is a part sectional, part elevational side view taken on line I—I of Fig. 2, and Fig. 2 is a sectional view taken on line II—II of Fig. 1, and Fig. 3 is a top elevational view taken on line III—III of Fig. 1, and Fig. 4 is a diagrammatic view of control circuits and control apparatus, and Fig. 5 is a modification thereof, and Fig. 6 is a diagrammatic view of a track layout to which one form of magnetic car retarder has been applied and Fig. 7 is a similar diagrammatic view of a modified form of track layout.

Referring to Figs. 1, 2 and 3, the magnetism generating unit 1, hereinafter termed magnetic braking unit, comprises housing 2, the upper half 3 of which has supporting lugs 4—4 adapted to be secured to ties 5—5 by lags 6—6, and the lower half 7 of which is secured to said upper half by bolts 8—8 and is adapted to support therebetween the polar ends 9—9 of magnet core 10 supporting magnet coil 11, the non-ferric bushings 12—12 acting as a magnetic insulator between said housing and core.

Pivotally supported on pole ends 9—9 by pins 13—13 are oscillating H shaped ferric members 14—14, the lower ends 15—15 of which are adapted to receive pins 16—16 interposed between which is spring 27 adapted to restrain ends 15—15 toward each other, and to the upper ends 17—17 of which are pivotally secured by pins 18—18, the lugs 29—29 of friction bars 19—19, and rigidly secured thereto are the shields 20—20, preferably made of non-magnetic material. The friction bars or brake beams 19—19 are also adapted to be guided by the steering plates 21—21 secured to the ties 5—5 by bolts 22—22 the tongues 23—23 of which enter rectangular orifices 24—24 in these brake beams, and these steering plates 21 permit substantial movement of these bars in a transverse plane but limit the movement of these bars in vertical and longitudinal planes.

The car axle unit 30, of known form comprises the axle section 31 and wheels 32—32 adapted to travel on rails 33—33 suitably secured to ties 5—5.

The upper housing 3 has orifices 34—34 in which are rigidly secured non-magnetic material bushings 35—35 having stop faces 36—36 against which faces 37—37 of H members 14—14 are adapted to impinge by action of spring 27 when no axle unit, as 30, is present on rails 33—33.

The faces 38—38 of friction bars 19—19 are adapted to be magnetically attracted, as will be more fully hereinafter described, to the inner faces 39—39 of wheels 32—32.

A suitable cable outlet as 40, and a suitable drain as 41, are provided to the housing 2.

Referring to Figs. 4 and 5, the magnetic braking units 1A to 1F inclusive, are units similar to the unit 1 shown in Figs. 1, 2 and 3, and are adapted to be controlled by controller 45, the contact drum 46, (shown in developed form), of which rotates on shaft 47, at one end of which are rigidly secured two ratchet wheels 48 and 49 arranged in juxtaposition and having ratchet teeth 50 and 51, the ratchet dog 52 pivoted on pin 53 secured to bar 54 normally impinging on stop pin 55 by action of spring 56 and adapted to be restrained downwardly by magnet 57, being adapted to rotate ratchet wheel 48 and drum 46 in clockwise direction by engagement with a tooth, as 50; and ratchet dog 58, likewise pivoted on a pin 53 secured to a similar bar 54, normally impinging on a similar stop pin 55 by action of a similar spring 56 and also adapted to be restrained downwardly by a similar magnet 57, being adapted to rotate ratchet wheel 49 and drum 46 in a counter-clockwise direction by engagement with a tooth as 51, each complete movement of magnet 57, bar 54 and ratchets 52 or 58 moving drum 46 circumferentially from one contact position as shown to another, and, wherein contact springs 59—59 are adapted to disengage from one row of contacts, as K, and engage another row of contacts, as for example the adjacent row L. In other words, the wheels 48—49 constitutes a double ratchet wheel which is rotated in a clock-wise direction if dog 58 is held to the left and dog 52 is reciprocated vertically, and is operated in a counter-clockwise direction if dog 52 is held toward the right and dog 58 is reciprocated vertically.

Levers 60—60 pivotally mounted on pins 61—61 having insulated studs 62—62 adapted to close contact fingers 63—63, and lugs 64—64 adapted to unlatch dogs 52 and 58, are normally restrained against stop pins 65—65 by spring 66 interposed between the free ends 67—67 of ratchet dogs 52 and 58. The spring also urges dogs 52 and 58 inwardly to latching position, magnets 68—68 acting to move said levers outwardly and thereby unlatch said dogs and simultaneously establish a circuit through said contacts as will be more fully hereinafter described.

Whereas contact drum 46 may have any number of positions, four are shown the minimum braking position K comprising a full series circuit arrangement of the magnet coils, as 11, of units 1A to 1F inclusive, the more effective braking position L comprising three each of said coils in a series circuit and two of such series circuits being arranged in multiple, the still more effective braking position M, comprising two each of said coils in series and three of such series circuits arranged in multiple, and the maximum braking position N comprising all said coils in multiple connection.

When controller 45 is to be remotely controlled, and under which condition shaft 47 is supplied with ratchet wheels, as 48 and 49 and their depending parts, said controller is suitably housed and is placed adjacent the trackway and the magnetic braking units as 1A to 1F inclusively, as shown in Fig. 6, suitable conduits as 71 and 72 conducting the various wires or conductors between said controller, said units, and the tower 70. Said controller is preferably remotely controlled if said magnetic braking units are a considerable distance from the tower, in this manner economizing in the use of multiple conductor cables, whereas, if said units are adjacent said tower, the ratchet wheels, as 48 and 49, and depending parts therefor, are omitted and shaft 47 is manually operated by a handle, as 73, of modified controller 75, in the modified tower 117.

Towers 70 and 117 are supplied with suitable indicators as 76K to 76N inclusive of known form and which when energized will give an indication through aperture 77K to 77N inclusive.

The operation of applicants improved magnetic braking apparatus and system of control therefore, is as follows:— assuming one, or more cars having car axle units, as 30, to be moving into a braking zone as 78 in the direction of arrow X, see Fig. 6, and that the particular speed at which said car, or cars is traveling requires a comparatively small amount of retardation and under which condition the drum 46 of controller 45 will be moved to the minimum braking position shown in Fig. 4. As said car or cars enter said zone the operator in tower 70 will depress brake application lever 80 in this manner establishing the following circuit:—

*Minimum K position brake application circuit*

From positive energy, wire 81, lever 80, wire 82, contact 59, bridge contact 83K, contact 59, wire 84, coil 11 of magnetic braking unit 1A, wire 85, and thence similarly through bridge contacts 83K, contacts 59, and wires 84 and 85 through all coils 11 of units 1B to 1F inclusive in series, and thence through wire 86 to negative energy. With this circuit established the energization of said coils 11—11 establishes a magnetic circuit in each of said magnetic braking units as shown by the arrows, shown in Fig. 2, and which travels as follows:— from core 10 through right hand H member 14, into friction bar 19, thence from face 38 of said bar to face 39 of right hand wheel 32, thence through said wheel, axle 31 and left hand wheel 32 to face 39 thereof, and thence to face 38 of left hand bar 19 and thence through said bar to left hand H member 14 thereupon completing said magnetic circuit to core 10. It is to be noted from the foregoing description that a complete ferric circuit without an air gap has been formed whereby a comparatively large magnetic flux will flow therethrough, in this manner causing frictional faces 38—38 of bars 19—19 to be attracted to, and caused to impinge on frictional faces 39—39 on the inner side of wheels 32—32. and, as a car axle unit, as 30, comprising said wheels and an axle, as 31, move forward on rails 33—33 in the direction of arrow X, a frictional or braking action will obtain therebetween and whereby the rotation of said axle unit will be resisted, in this manner tending to retard the movement of the car which said axle unit normally supports. It is to be noted that the cumulative flux, neglecting leakage flux, of all the magnetic braking units, as 1A to 1F inclusive will pass through the aforesaid closed magnetic circuit and will continue to do so until the next pair of wheels (not shown) of said car contact with bars 19—19 whereupon the flux in said bars will flow through a divided path, and as more of said car axle units contact with said bars a further subdivision of the total flux into a further plurality of paths obtains, each flux path through each of said car axle units acting to restrain rotation of said car wheel units.

If, as said car axle units, as 30, move through braking zone 78, the car, or cars supported thereby, are sufficiently retarded in speed before said car, or cars have entirely passed through said zone, the operator in tower 70 will release lever 80, thereby opening the aforesaid circuit and, whereas the friction faces 38—38 of bars 19—19 will still impinge against faces 39—39 of wheels 32—32, substantially no braking will obtain, as the springs 27—27 of the magnetic braking unit 1A to 1F inclusive do not have sufficient tenson to cause such brakng, their function being to restrain the face 37 of H member 14 against stop face 36 of bushing 35 whereby friction bars 19—19 will contact with wheels 32—32 when and as said wheels enter a braking zone as 78.

Normally restrained downwardly by spring 87, but adapted to be raised by collar 88 secured to rod 89 arranged to be actuated by lever 80 and restrained upwardly to normal position by spring 90, is arc snubbing lever 91, said lever being arranged to close before lever 80 closes and remain closed until after lever 80 has opened.

When lever 80 was depressed as hereintofore described, lever 91 was also lowered thereby establishing the following circuit:—

Arc snubbing circuit

From positive energy wire 81, lever 80, wire 82, wire 92, lever 91, wire 93 incandescent lamps 94—94 in multiple series, and wire 95 to negative energy. It will be noted that with this circuit established the lamps, as 94—94 are in multiple with the hereintofore described "minimum brake application circuit" including coils 11—11 of magnetic braking units 1A to 1F inclusive, said coils having well known inductive characteristics. When brake application lever 80 is raised to open the hereintofore described "brake application circuit", a counter-electro-motive force is generated in known manner, and which tends to produce an arc, or spark between said lever and its contact, however, due to the closed position of arc snubbing lever 91, said counter electromotive force, hereinafter termed C. E. M. F. is dissipated through lamps 94—94 and therefore no substantial arc will obtain as brake applying lever 80 is raised and the brake applying circuit is opened, said dissipation being completed before collar 88 acts to raise lever 91 and open said "arc snubbing circuit".

The lamps 94—94 are preferably what are known as carbon filament incandescent lamps the filament of such lamps having a substantially high resistance when cold and a comparatively low resistance when hot. The lamps are preferably selected and connected whereby no glow of the filament appears as the impressed voltage normally supplied to the "brake application circuit" is impressed on said "arc snubbing circuit" through lever 91. It is known that counter E. M. F.'s of inductive circuits are usually substantially in excess of the impressed electromotive force and therefore as lever 91 is raised the C. E. M. F. dissipated in lamps 94—94 will cause a substantial glow of their filaments, in this manner producing a substantially low path of resistance during the maximum C. E. M. F. dissipation period. It may be said that said lamps act as a visual condenser. If desired a condenser of known form in connection with energy dissipating devices may be substituted for said lamps.

With the contact drum 46 in the K position, as shown in Fig. 4, a circuit is established to indicator 76K as follows:

K indicator circuit

From positive energy, wire 96, contact finger 97, contact band 98, wire 99, contact 100K, contact finger 101K, wire 102K, indicator 76K and wire 103 to negative energy. With this circuit established indicator 76K is energized and its disk in opening 77 informs the operator in tower 70 that minimum braking effect will be effective if brake application lever 80 is depressed.

Assume again that one or more additional cars are shunted over the "hump" and into car retarding section 78, and that the speed of said car, or cars is such that more effective braking is required than when the hereintofore described braking was accomplished with controller 45 in the K position, and assuming further that said proposed braking is required to be substantially again as much as the former braking, and therefore, that the series multiple arrangement of connections of position L is to be employed. The operator in tower 70 will depress high braking contact lever 104, one time, to thus send out a one impulse code, in this manner establishing the following circuit:—

Controller drum high dog release circuit

From positive energy, wire 106, lever 104, wire 106a, and magnet 68, returning to negative energy, as this circuit is established and magnet 68 is energized, its core causes lever 60 to move to the left away from stop 65 and whereby lug 64 restrains ratchet dog 58 out of engagement with ratchet wheel 49, and contact fingers 63—63 are closed in this manner establishing the following circuit:—

Controller drum high braking actuating circuit

From positive energy, contact springs 63—63 (in closed position), wire 107, right hand magnet 57 and thence to negative energy. As this circuit is established and magnet 57 is energized thereby, bar 54 and dog 52 move downwardly and, as said ratchet dog is in engagement with a tooth as 50, ratchet wheel 48, and therefore, shaft 47 and drum 46 are rotated clockwise, in this manner moving said drum from the K contact position to the L contact position, and as brake application lever 80 is depressed a more effective brake application circuit is established as follows:—

L brake application circuit

From positive energy, wire 81, lever 80, wire 82, contact finger 59, contact 83L, from where a multiple path flows, one path passing to contact finger 59, wire 84 to coil 11 of unit 1A and thence in series circuit through coils 11—11 of units 1B and 1C and thence to contact 110L, wire 112L, contact 59; and the other path comprising wire 111L, contact 112L, contact finger 59, wire 84, coil 11 of unit 1D and thence in series arrangement through coils 11—11 of units 1E and 1F to wire 85, contact finger 59, contact 83L, contact finger 59, and wire 86 to negative energy. It will be noted that three coils, as 11 are in series and that two such series circuits are connected in multiple, in this manner increasing the current in said coils two fold and therefore the magnetic flux and braking effect in substantially the same proportion.

As the method of re-connecting a number of magnet coils from series to multiple series is known it will be sufficient from the foregoing description to state that as controller actuating lever 104 is again depressed, thus constituting a two impulse code, drum 46 as hereintofore described, will be moved from the L to the M position whereby coils 11—11 of units 1A and 1B will be connected in a series circuit, likewise the similar coils of units 1C and 1D; and likewise the similar coils of units 1E and F, will be connected in a series, and said three series circuits will be connected in multiple, and whereby substantially four times the current flow will obtain, and the magnetic flux and braking effect will be again increased substantially two fold. Again depressing lever 104 will similarly move drum 46 to the N or full series position and whereby all the coils as 11—11 of units 1A to 1F inclusive will be arranged in series, in this manner supplying substantially six times the minimum flow of current and therefore substantially a six fold braking effect as one or more cars are passed through a retarding zone as 78, and assuming further that brake application lever 80 is depressed to establish the brake application circuit as said cars pass through said zone.

Thus the degree of retardation desired is obtainable through sending out a code from the tower to the code responsive stepping means of Fig. 4; codes of 1, 2, 3 and 4 impulses respectively, giving K, L, M, and N degrees of retardation.

As said drum is moved from the M to the N position, as hereintofore described, contact 100K will leave contact finger 101K, cancelling the braking indication in indicator 76K, and contact 100L will pass under contact finger 101L, whereupon an indication is established in indicator 76L, in this manner informing the operator in tower 70 that the L position, or degree of braking can be made effective by depressing brake application lever 80. In a similar manner when said drum is moved to the M braking position contact 100M will contact with contact finger 101M and establish said indicating circuit to indicator 76M, and, as contact 100N contacts with contact finger 101N a similar circuit is established to indicator 76N.

If for any reason drum 46 of controller 45 should be in a major braking position and it is desired to establish a lesser degree of braking, as for example, from the N to the M; from the M to the L, or from the L to the K position, the low braking lever 105 is depressed whereupon the following circuit is established:—

*Controller drum low dog release circuit*

From positive energy, wire 106, lever 105, wire 115, and right hand magnet 68 returning to negative energy. As this circuit is established, the right hand lever 60 is drawn to the right, unlatching dog 52 and closing contact fingers 63—63 and whereby the following circuit is established:—

*Controller drum low braking actuating circuit*

From positive energy, contacts 63—63, wire 108 and left hand magnet 57, to negative energy, as the aforesaid circuit is established the left hand bar 54 and ratchet dog 58 are drawn downwardly, and, as said dog is in engagement with a tooth, as 51, and dog 52 is unlatched from teeth 50, as said dog 58 is drawn downwardly, the ratchet 49, shaft 47 and drum 46 are rotated counter clockwise in this manner moving said drum from a major to a minor braking position.

It is to be noted that as the aforesaid change from major to minor braking position obtains, a corresponding change of indication obtains in indicators 76 whereby the operator will always be cognizant of the degree of braking which may be applied to one or more cars to be retarded.

From the foregoing it will be apparent that when applicants novel system of magnetic braking is employed to retard freight cars, or similar vehicles, the braking effect may be instantly applied, or released at will, also that the degree of the effectiveness of said braking may be varied independently of the application of the braking, and further that the said degree of effective braking is always indicated to the operator controlling said braking.

Referring to Fig. 7, the car retarding zone 79 is shown as equipped with magnetic braking units 116—116 which may be of the type disclosed in my co-pending applications Serial No. 245,143 and 245,144 filed January 7, 1928, or of the type shown in my co-pending application Serial No. 245,142 filed January 7, 1928.

Referring to Fig. 5, the control tower 117 is similar to tower 70, however has therein the control unit 75 in which a control drum, as 46, is adapted to be actuated by manually controlled handle 73, as hereintofore described. When a controller, as 75, is located in a tower, as 117, the several wires as 82, 84, and 85 are formed into a cable, as 118 which is interposed between said tower controller and a car retarding zone, as 78, where the various magnetic braking units, as 1A to 1F inclusive are located.

Whereas the steering plates, as 21—21 are shown made of non-ferric material they may be made of ferric material and their tongues as 23—23 suitably magnetically insulated whereby an air-gap obtains between said tongues and the walls of orifices 24—24 in friction bars 19—19.

It is to be understood that by the term "braking" is implied car retarding, namely, that the movement of one or more cars through a car retarding zone, is being reduced in speed.

If desired the wires or conductors 111L and 111M may be made substantially resistive in this manner furnishing a comparatively lesser variation in braking as controller drum 46 is moved from one position to another.

It is to be noted that the friction braking bars 19—19 extend upwardly above the top of the rails 33—33 in this manner permitting the friction faces 38—38 thereof to engage a larger area of the friction face 39—39 of wheels 32—32 than if the top of said bars were arranged on the same level as the top of rails 33—33. Referring to Fig. 4 of the drawings, since a specific number of impulses must be applied to a particular wire (wire 106ᵃ or 115) to carry out a particular function the step-by-step mechanism at the upper right hand corner of Fig. 4 may be said to be code responsive or impulse responsive. In other words, by transmitting a particular code of impulses from the operator's tower to the car retarder a particular degree of braking may be imposed by the car retarder.

What I claim is:—

1. A car retarder of the type in which brake shoes disposed along the railway track are adapted to engage the sides of passing car wheels comprising brake shoes, electrically controlled means for operating said brake shoes, movable selecting means for controlling said electrically controlled means and code responsive apparatus for moving the said selecting means.

2. A car retarder of the type in which brake shoes disposed along the railway track engage the sides of passing car wheels comprising brake shoes electrically controlled means for operating said brake shoes, code responsive means for controlling said electrically controlled means, and means for controlling said code responsive means from a distant tower.

3. A car retarder of the type in which brake shoes disposed along the railway track are adapted to engage the sides of passing car wheels comprising brake shoes, movable controlled means for controlling the operation of said brake shoes, means for electrically controlling said movable means, and means in a tower, and operated by said electrically controlled means for indicating at the tower the condition of said electrically controlled means.

4. A car retarder of the type in which brake shoes disposed along the railway track are adapted to engage the sides of passing car wheels comprising brake shoes, movable means for controlling the operation of said brake shoes, means for controlling movement of said movable means by electrical impulses means for controlling said impulse controlled means from a distant point, and means operated by said electrical impulse controlled means for indicating at the distant point the condition of said electrically controlled means.

5. A car retarder of the electro magnetic type comprising, a plurality of braking units located along the trackway each of which if electrically energized effects braking of a passing car in accordance with the degree of energization thereof, and a circuit controllable from a distant tower for including either some or all of said braking units in series.

6. A car retarder of the electro magnetic type comprising, a plurality of braking units located along the trackway each of which if electrically energized effects braking of a passing car in accordance with the degree of energization thereof, and circuit controlling means for energizing all of said braking units in series or for energizing said braking units by a series multiple circuit so that half of the braking units only are included in series.

7. A car retarder of the electro magnetic type comprising; a plurality of braking units located along the trackway each of which if electrically energized effects braking of a passing car in accordance with the degree of energization thereof; and means for energizing said braking units in series, in series multiple or in multiple.

8. A car retarder of the type in which brake shoes positioned along a railway track are adapted to engage the sides of passing car wheels, comprising brake shoes, means for operating said brake shoes, movable selecting apparatus for controlling said means and code responsive mechanism for moving the selecting apparatus.

9. A car retarder of the type in which brake shoes positioned along a railway track are adapted to engage the sides of passing car wheels, comprising brake shoes, means for operating said brake shoes, code responsive selecting apparatus, movable in response to electrical impulses, for controlling said means and selecting various degrees of retardation, and indicating means for indicating the degree of retardation so selected.

OSCAR A. ROSS.